United States Patent Office 3,443,148
Patented May 6, 1969

3,443,148
CAMERA TUBE DEFLECTION SYSTEM FOR PROVIDING BEAM SHUTTER ACTION
Alexander Edward Huston, Reading, and David Alwyn Procter, Basingstoke, England, assignors to United Kingdom Atomic Energy Authority, London, England
Filed Oct. 30, 1967, Ser. No. 679,045
Claims priority, application Great Britain, Nov. 3, 1966, 49,402/66
Int. Cl. H01j 29/52
U.S. Cl. 315—30    4 Claims

ABSTRACT OF THE DISCLOSURE

One form of high-speed image-tube camera includes an image-tube having an aperture plate and a pair of deflector plates at each side thereof, and a waveform generating circuit for applying relatively phase-displaced waveforms to the pairs of deflector plates to provide pairs of stationary images. The invention provides an improved waveform generating circuit for such a camera comprising an inductor connected in parallel with a capacitor, the inductor being divided into two series-connected portions by a triggerable switch, connections for charging the capacitor symmetrically about a reference potential, and connections for applying the voltage waveform across the capacitor to both pairs of deflector plates, the connections including means, e.g. resistors, for producing a phase displacement between the waveforms applied to the two pairs of plates.

Cross-reference to related application

The form of image-tube camera referred to in the above abstract is the subject of co-pending U.S. application Ser. No. 371,350, filed June 1, 1964, now Patent No. 3,378,721, by A. E. Huston.

Background of the invention

This invention relates to high-speed cameras of the type which employ electron image-tubes.

In our British patent specification No. 1,016,930 there is described a form of camera comprising an image-tube having an aperture plate and a pair of deflector plates at each side thereof for applying opposing electric fields to the beam so that the beam is periodically deflected to pass through the aperture for a defined time, thereby providing shutter action, but is immobile on striking on the screen, the opposing electric fields being derived from two trains of waveforms, preferably sinusoidal, which are displaced in phase relative to one another to provide two separate residence positions on the screen as the waveforms alternate in polarity. The two pairs of deflector plates are known as shutter plates and compensating plates respectively. Further pairs of residence positions are provided by a "staircase" waveform applied to a third pair of deflector plates (hereinafter termed shift plates) at 90° to the shutter and compensating plates.

In the embodiment described in the above specification the wave-trains are generated by a valve-driven oscillator circuit. The present invention provides an improved waveform-generating circuit having reduced power consumption and whose operation can be more readily initiated by an external trigger pulse. The latter facility is important in synchronising a sequence of photographs with the event being photographed.

Summary of the invention

According to the present invention, in an image-tube camera including an image-tube having an aperture plate and a pair of deflection plates at each side thereof, and a waveform generating circuit for applying relatively phase-displaced waveforms to said pairs of deflector plates, said circuit comprises an inductor connected in parallel with a capacitor, said inductor being divided into two series-connected portions by a triggerable switch, connections for charging said capacitor symmetrically about a reference potential, and connections for applying the voltage waveform across said capacitor to both pairs of deflector plates, the connections including means for producing a phase displacement between the waveform applied to the shutter and to the compensating plates.

Preferably the capacitor connected in parallel with the inductor is constituted by two series-connected capacitors having their junction connected to said reference potential.

Preferably a further capacitor is connected in parallel with said triggerable switch.

Preferably the phase-changing means in said connections are resistors.

Description of the drawings

To enable the nature of the present invention to be more readily understood, attention is directed, by way of example, to the accompanying drawings, wherein.

Description of the preferred embodiment

Figure 1:
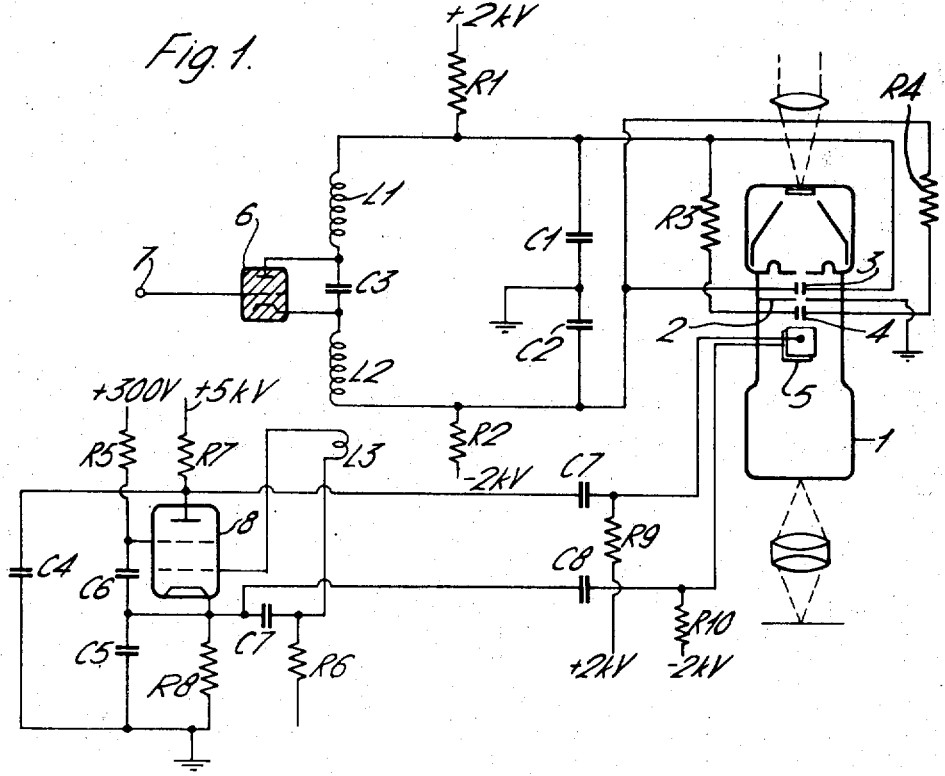
FIGURE 1 is a circuit diagram of an embodiment of the invention.

FIGURE 1 shows, in simplified diagrammatic form, an image-tube 1 forming part of an image-tube camera, as described in the aforementioned specification. For present purposes only the relevant parts of the tube are numbered, namely the aperture plate 2, the shutter plates 3, the compensating plates 4 and the shift plates 5.

The waveform-generating circuit comprises a parallel resonant circuit formed by inductors L1 and L2 connected in series by a thyratron 6 constituting a triggerable switch, and a capacitor constituted by capacitors C1 and C2 connected in series, their junction being connected to a reference potential, viz earth. The capacitors are charged symmetrically via high-value resistors R1 and R2 connected to high positive and negative potentials (±2 kv.) respectivly. A capacitor C3 is connected in parallel with thyratron 6. The voltage across C1 and C2 in series is applied directly to the shutter plates 3, and with opposite polarity, via resistors R3 and R4, to the compensating plates 4.

Figure 2:
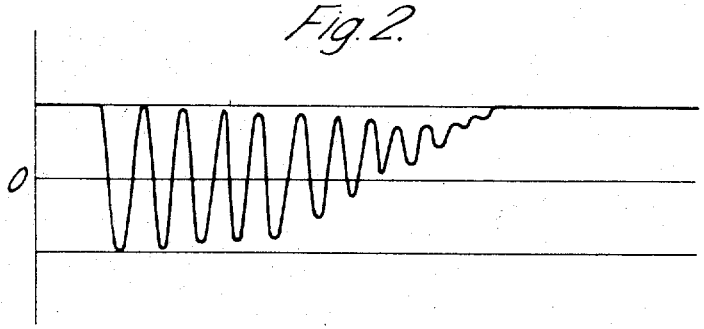
FIGURE 2 shows the waveform obtained with the embodiment of FIGURE 1.

In operation thyratron 6 is initially non-conducting and capacitors C1, C2 and C3 are fully charged. The shutter and compensating plates are oppositely polarized by the DC charging potentials, their mean potential being earth. The DC field between the shutter plates deflects the electron beam away from the aperture and the "shutter" is therefore closed. When it is desired to take a sequence of photographic frames, thyratron 6 is triggered into conduction by a short pulse via terminal 7 and C1 and C2 discharge through L1 and L2 in series. The resonant circuit formed by these components goes into a damped oscillation, as shown in FIGURE 2, and the oscillatory voltage is applied to the deflector plates to provide shutter and compensating action in the manner described in the aforementioned specification. The necessary small phase displacement between the shutter and compensating waveforms, which provides two residence positions, is produced by the inclusion of resistors R3 and R4 in the connections to the compensating plates, the resistors acting in conjunction with the self-capacitance of these plates to form a resistance-capacity phase-shift network.

Only the first few cycles (e.g. eight cycles for sixteen frames) are used for shutter action, by which time the maximum stepwise shift of the beam has been applied by plates 5, as described in the aforementioned specification. As the capacitors discharge, thyratron 6 eventually ceases to conduct, and when the oscillation finally dies away, the initial condition restores itself (as shown in FIGURE 2), in which capacitors C1 and C2 are recharged and the "shutter" is closed.

The inclusion of C3 improves the waveform of the first quarter-cycle of the oscillation by providing an initial discharge time-constant which can be matched to the waveform of the resonant frequency of the circuit, and also reduces the non-linear effects of the thyratron by by-passing it with a low-impedance RF path.

FIGURE 1 also shows the circuit which provides the stepwise shift "staircase" waveform described in the aforementioned specification. It comprises a tetrode 8 having large anode and cathode resistors R7 and R8, the anode resistor being taken to about +5 kv. and the cathode resistor to earth. Capacitors C4 and C5 shown connected from anode and cathode respectively to the negative supply, are in fact stray capacitances, although parallel capacitors may be added to balance the values. The screen is fed by resistor R5 and tied to the cathode by capacitor C6. The grid is DC biased beyond cut-off via resistor R6, and a winding L3, coupled to L2, is connected to apply a signal between grid and cathode via the DC blocking capacitor C7. The shift plates 5 are connected to anode and cathode via blocking capacitors C7 and C8 respectively, and to DC shift potentials of ±2 kv. via high-value resistors R9 and R10 respectively.

In operation tetrode 8 is normally biased off and the plates 5 are held at their standing DC shift potentials. When thyratron 6 is triggered, a sinusoidal voltage is induced in L3 whose positive half-cycles are sufficient to overcome the bias on tetrode 8 and bring it into conduction. During each conducting period the anode voltage falls and the cathode voltages rises by a constant amount, providing a push-pull staircase waveform which eventually reverses the DC voltages initially applied to the shift plates via resistors R9 and R10, thereby progressively displacing each successive pair of frames across the screen as described in the aforementioned specification. At the end of the staircase, valve 8 ceases to conduct and the voltages on shift plates 5 drift back to their initial values.

Component values in one embodiment, using a tube similar to that described in the aforementioned specification and designed to oscillate at 10 mc./s., were (resistors in ohms):

| | |
|---|---|
| R1, R2 | 10M |
| R3, R4 | 150 |
| R5 | 1M |
| R6 | 100K |
| R7, R8 | 330K |
| R9, R10 | 4.7M |
| C1, C2 ___pf__ | 500 |
| C3 ___pf__ | 1000 |
| C6 ___µf__ | 0.25 |
| C7, C8 ___µf__ | 0.03 |
| L1, L2 ___µh__ | 0.5 |

We claim:
1. In an image-tube camera including an image-tube having an aperture plate and pairs of shutter and compensating deflector plates at each side thereof, and a wave form generating circuit for applying relatively phase-displaced waveforms to said pairs of deflector plates, the improvement wherein said circuit comprises an inductor connected in parallel with a capacitor, said inductor being divided into two series-connected portions by a triggerable switch, connections for charging said capacitor symmetrically about a reference potential, and connections for applying the voltage waveform across said capacitor to both pairs of deflector plates, the connections including means for producing a phase displacement between the waveform applied to the shutter and to the compensating plates.

2. An image-tube camera as claimed in claim 1 wherein the capacitor connected in parallel with the inductor is constituted by two series-connected capacitors having their junction connected to said reference potential.

3. An image-tube camera as claimed in claim 2 wherein a further capacitor is connected in parallel with said triggerable switch.

4. An image-tube camera as claimed in claim 2 wherein the phase-displacing means in said connections include series-connected resistors.

References Cited

UNITED STATES PATENTS 3,378,721   4/1968   Huston _____ 315—30

RICHARD A. FARLEY, *Primary Examiner.*

MALCOLM F. HUBLER, *Assistant Examiner.*

U.S. Cl. X.R.

352—204